United States Patent
Bradford et al.

(10) Patent No.: US 10,603,762 B2
(45) Date of Patent: Mar. 31, 2020

(54) MACHINING GUIDE ASSEMBLIES AND METHODS RELATING THERETO

(71) Applicants: TRU-CUTT MANUFACTURING LLC, Napa, CA (US); Andrew J. Bradford, Napa, CA (US); Jesse Macgregor Brown, Napa, CA (US)

(72) Inventors: Andrew J. Bradford, Napa, CA (US); Jesse Macgregor Brown, Napa, CA (US)

(73) Assignee: TRU-CUTT MANUFACTURING LLC, Napa, CA (US)

( * ) Notice: Subject to any disclaimer, the term of this patent is extended or adjusted under 35 U.S.C. 154(b) by 90 days.

(21) Appl. No.: 15/505,937

(22) PCT Filed: Oct. 15, 2015

(86) PCT No.: PCT/US2015/055838
§ 371 (c)(1),
(2) Date: Feb. 23, 2017

(87) PCT Pub. No.: WO2016/061420
PCT Pub. Date: Apr. 21, 2016

(65) Prior Publication Data
US 2018/0207767 A1    Jul. 26, 2018

Related U.S. Application Data

(60) Provisional application No. 62/064,674, filed on Oct. 16, 2014.

(51) Int. Cl.
| | | |
|---|---|---|
| B24B 41/06 | (2012.01) | |
| B23D 51/02 | (2006.01) | |
| B23Q 9/00 | (2006.01) | |

(52) U.S. Cl.
CPC .......... B24B 41/067 (2013.01); B23D 51/025 (2013.01); B23Q 9/0014 (2013.01)

(58) Field of Classification Search
CPC . B24B 41/067; B26Q 9/00114; B23D 51/025; B23D 55/082; B23D 21/08; B26D 7/0006; B26D 3/16; Y10T 83/8889
(Continued)

(56) References Cited

U.S. PATENT DOCUMENTS 2,622,323 A * 12/1952 Grimaldi ................ B23D 21/08
30/101
2,747,275 A * 5/1956 Jonasson ................ B23D 21/08
30/101
(Continued)

FOREIGN PATENT DOCUMENTS

| JP | 10000575 A | 1/2010 |
| JP | 3181057 U | 12/2012 |
| KR | 20000006289 A | 1/2000 |

OTHER PUBLICATIONS

International Search Report and Written Opinion for International Patent Application No. PCT/US2015/055838, dated Jan. 27, 2016, 8 pages.

Primary Examiner — Ghassem Alie
(74) Attorney, Agent, or Firm — EcoTech Law Group, P.C.

(57) ABSTRACT

Machining guides and methods relating thereto are described. One example of the machining guide, according to the present arrangement, includes: (i) two or more frames, each of which includes—(a) a first guide member including first multiple plates; (b) a second guide member including second multiple plates; and (c) a pivoting connection pivotably connecting the first guide member and the second guide member, and wherein, during an operative state of the machining guide, one or both of the first and the second
(Continued)

guide members of two or more of the frames pivot about the pivoting connection to allow two or more of the frames to be disposed around the workpiece; and (ii) one or more spacer plates being disposed between each of the frames and define a kerf between each of the frames such that, during the operative state of the machining guide, a tool through the kerf is capable of machining the workpiece.

17 Claims, 7 Drawing Sheets

(58) Field of Classification Search
USPC ...... 83/762, 862, 310, 319; 30/92, 378, 371, 30/373, 392, 96, 94, 95, 182, 241, 101, 30/90.2, 90.3
See application file for complete search history.

(56) References Cited

U.S. PATENT DOCUMENTS

| | | | |
|---|---|---|---|
| 4,063,355 A * | 12/1977 | Netzel | B23D 21/08 30/101 |
| 4,078,304 A * | 3/1978 | Netzel | B23D 21/08 30/101 |
| 5,499,578 A * | 3/1996 | Payne | A47J 43/18 30/114 |
| 2012/0207547 A1 | 8/2012 | Guzick et al. | |
| 2012/0211113 A1 | 8/2012 | Bowie | |
| 2015/0096420 A1* | 4/2015 | Kloiber | B23D 51/025 83/829 |

* cited by examiner

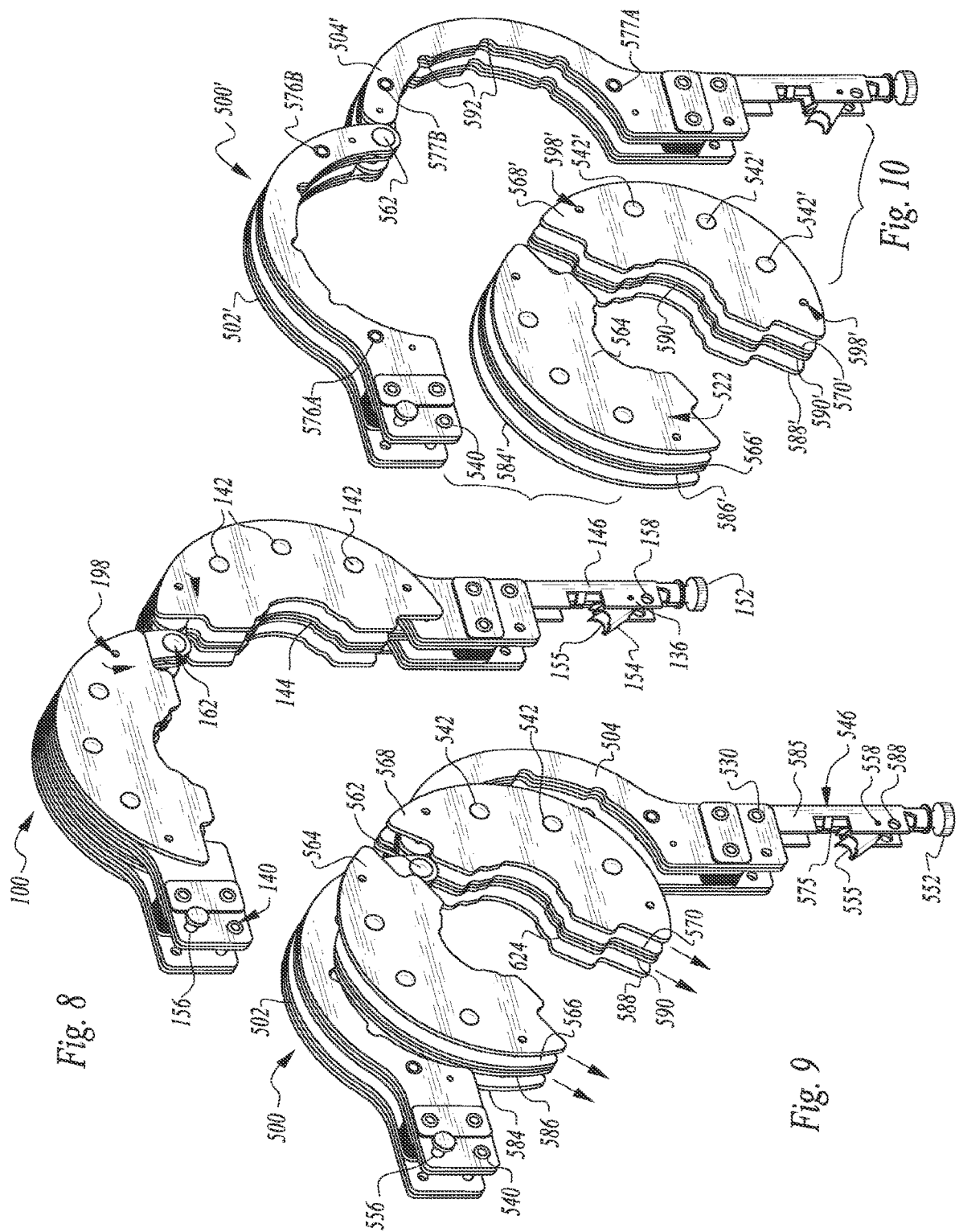

MACHINING GUIDE ASSEMBLIES AND METHODS RELATING THERETO

CROSS REFERENCE TO RELATED APPLICATIONS

The present application claims the benefit from International No PCT/US2015/055838, which was granted an International filing date of Oct. 15, 2015, which in turns claims priority to a provisional application that was assigned application number 62/064,674, and was filed on Oct. 16, 2014, which applications are hereby incorporated by reference in their entireties.

FIELD

The present invention relates generally to machining guides and related methods that involve effectively guiding a tool during machining of a secured workpiece. More particularly, the present invention relates to novel machining guides and novel methods of assembling them and methods of using them to produce a precisely machined workpiece.

BACKGROUND

Conventional clamp designs fail to effectively guide or secure a workpiece during a machining operation, resulting in imprecisely machined workpieces. Moreover, workpieces of different sizes often require different dimensions of clamps to secure them. As a result, a craftsperson or a machining operation requires that many different clamp sizes be kept at hand. Given that conventional clamp are made from stainless steel or a similar heavy material, not only are they are difficult to carry, but the process of changing them out from one clamp size to another to accommodate the different sizes of workpieces is cumbersome and time consuming.

What is, therefore, need are novel solutions for effectively securing a workpiece during a high throughput machining process that provides a precisely machined workpiece.

SUMMARY

In view of the foregoing, in one aspect, the present arrangements provide novel machining guides that overcome the drawbacks of the conventional clamps designs. An exemplar machining guide according to the present arrangements includes: (i) two or more frames, each of which includes—(a) a first guide member including first multiple plates; (b) a second guide member including second multiple plates; and (c) a pivoting connection pivotably connecting the first guide member and the second guide member, and wherein, during an operative state of the machining guide, one or both of the first and the second guide members of two or more of the frames pivot about the pivoting connection to allow two or more of the frames to be disposed around the workpiece; and (ii) one or more spacer plates being disposed between each of the frames and define a kerf between each of the frames such that, during the operative state of the machining guide, a tool passing through the kerf is capable of machining the workpiece. The tool may be any member chosen from a group comprising cutting apparatus, sanding apparatus, polishing apparatus and truing up apparatus.

In accordance with one preferred embodiment of the present arrangements, at or near a center region of each of the first and the second frames, there is defined an aperture for accommodating the workpiece during an operative state of the machining guide.

Each of the first multiple plates and the second multiple plates may include at least one extended base plate and at least one non-extended base plate. The extended base plate includes an extended base portion and the non-extended plate does not include the extended base portion. In this embodiment of the present arrangements, the non-extended base plates in the first and the second guide members associated with one frame are arranged to face the non-extended base plates in the first and the second guide members associated with another frame. One preferred arrangement of the machining guide involves disposing one or more of the spacer plates between the non-extended base plates associated with one frame and the non-extended base plates associated with another frame.

The present arrangements also provide features that firmly secure the workpiece and prevent its movement resulting from significant forces applied on it during machining. To this end, preferred embodiments of the present arrangements include a locking mechanism fastened at one end to a first end of each of the extended base portions of the extended base plates associated with one frame and associated with another frame. In this configuration, the extended base plate associated with one frame is arranged to face the extended base plate associated with another frame.

The locking mechanism may include a housing, which houses certain components of the locking mechanism and may extend from the first end to a second end of the each of extended base portions of the extended base plates associated with one frame and associated with another frame. In one implementation of this arrangement, the housing includes an alignment point such that at or near the second end, an aperture is defined to receive a safety device, and in one operative state of the locking mechanism, the safety device, pushes up against the housing to engage with the alignment point. At another end of the locking mechanism, an engaging member is disposed. The engaging member has an engaging profile that in a locked position of the locking mechanism, engages with an object attached to a second end of the extended base portions of the extended base plates associated with one frame and associated with another frame. The object, among other things, may include a pin connection that extends between two or more of the extended base plates that face each other. In one preferred embodiment of the present arrangements, the engaging member is spring loaded such that when preparing for a locking process using the locking mechanism, the engaging member is aligned with the pin.

In certain embodiments of the present teachings, where the housing is part of the locking mechanism, the housing houses a shaft that is threaded to receive a threaded shaft head. The shaft is preferably rotatably coupled to the threaded shaft head such that the shaft head is capable of rotating about an axis that passes through the shaft. In this arrangement, the shaft head may be rotated about the axis to push against or, alternatively, move in a direction opposite to the housing. In one preferred embodiment of this arrangement, the above-mentioned engaging member is coupled to the housing such that the shaft head is capable of being rotated to push or engage against the housing. As it is being pushed or engaged, the housing preferably applies a force on the engaging member to hold the machining guide in a secure position around the workpiece.

The locking mechanism preferably comprises a housing that has two parallel surfaces. In a locked position of the locking mechanism, each of two the parallel surfaces contact and/or align with a surface of the above-mentioned extended base portions of the extended base plates of two or more of the frames to firmly secure the machining guide to the workpiece.

In addition to the locking mechanism, certain preferred embodiments of the present arrangements include one or more supplemental plates and/or guide inserts that are coupled to surfaces of the first and the second multiple plates (of the first and the second guide members of two or more of the frames). At or near a center region of each of the first and the second multiple plates, an aperture is preferably defined to accommodate the workpiece during an operative state of the machining guide. Moreover, in this configuration, at or near a center region of the one or more of supplemental plates and/or guide inserts, a supplemental aperture is also defined, such that, during an operative state of the machining guide, the supplemental aperture aligns with the aperture (defined by the first and second multiple plates) to receive the workpiece. In one implementation, the present teachings provide that a portion of one or more of the supplemental plates and/or the guide inserts that is disposed at or near a center region (of the supplemental plate(s) and/or the guide insert(s)) and that defines the supplemental aperture, includes certain protruding features. When this portion (of the supplemental plate(s) and/or the guide insert(s)) is disposed around the workpiece, the protruding features contact and effectively secure the workpiece.

One or more supplemental plates and/or guide inserts may include different type of surface. By way of example, the supplemental plate(s) and/or the guide insert(s) may include "cut surfaces" that are coupled to certain of the first and the second multiple plates, which face the kerf between two frames. In this configuration, the cut surfaces of the supplemental plate(s) and/or of the guide insert(s) are also arranged to face the kerf between the two frames. As another example, the supplemental plate(s) and/or the guide insert(s) may include "exposed surfaces" that are coupled to certain of the first and the second multiple plates, which face away from the kerf between the two frames. In this configuration, the exposed surfaces of the supplemental plate(s) and/or the guide insert(s) are also arranged to face way from the kerf or be exposed.

According to certain implementations of the present machining guide, each of the first and the second guide members may include surfaces having defined thereon one or more apertures, each of which is designed to receive a fastener that attaches one or more supplemental plates to each of the first and the second guide members. In one embodiment, the supplemental plates are attached permanently and in another embodiment, the supplemental plates are attached temporarily. In those embodiments where supplemental plates need to be attached temporarily for example, for a quick change out of the tool due to a change in the size and/or shape of the workpiece, guide inserts are preferably used.

Regardless of whether supplemental plates or guide inserts are used, one or more pins may occupy one or more aligning apertures defined on surfaces of the supplemental plates and/or the guide inserts. Surfaces of the supplemental plate(s) and/or the guide insert(s) may have defined thereon one or more engaging apertures (which are different from the aligning apertures). In an assembled state of said machining guide, one or more of the pins align with one or more notches, which are part of the multiple plates of two or more of the frames. In this configuration, one or more guide points, which are disposed on surface of the supplemental plates and/or the guide inserts, engage with the engaging apertures.

In another aspect, the present teachings provide methods of machining. One example of such machining methods includes: (i) obtaining a machining sub-assembly including two or more frames based on shape and/or size of a workpiece; (ii) attaching one or more supplemental plates and/or one or more guide inserts onto the machining sub-assembly to form a machining guide; (iii) positioning the machining guide onto the workpiece such that one or more of the supplemental plates and/or one or more of the guide inserts contact the workpiece and that a portion of the workpiece is exposed to the kerf; (iv) locking the machining guide to completely secure the machining guide to the workpiece; and (v) machining the workpiece through the kerf to form a machined surface. The above-mentioned machining subassembly includes spacer plates disposed between two or more of the frames to define a kerf between the frames. The supplemental plates and/or the guide inserts may include a cut surface such that the above-mentioned attaching step includes arranging the cut surface to face the kerf.

Another implementation of the machining method further includes: (i) unlocking the machining guide to displace the machining guide from the workpiece; and (ii) reversing placement of the supplemental plates and/or the guide inserts relative to the set of two or more frames to form a modified machining guide, in which the cut surface faces away from the kerf and an exposed surface (that is opposite to the cut surface) of the supplemental plates and/or the guide inserts, faces towards the kerf; (iii) placing the modified machining guide on the workpiece such that the machined surface is disposed relative to the cut surface of the modified machining guide; (iv) locking the modified machining guide to completely secure the modified machining guide to the workpiece; and (v) trueing up the machined surface relative to the cut surface of the guide insert to form a trued surface of a workpiece.

The step of positioning the workpiece in the machining guide preferably includes: (i) identifying on the workpiece a machining location where the workpiece is to undergo machining; and (ii) securing the machining guide to the workpiece such that the machining location is exposed to the kerf. The step of identifying more preferably further includes identifying on the workpiece a secondary location, which is a certain distance away from the machining location. Further, during the step of securing, the secondary location is substantially aligned with an outside boundary (e.g., exposed surface of the supplemental plates and/or the guide inserts, faces) of the machining guide.

The step of locking may include using a primary locking mechanism and a secondary locking mechanism that prevents displacement of the primary locking mechanism in an operative state. In the event the tool is a reciprocating saw or includes a blade that is capable of being inserted in the kerf at one end while it is secured at another end, the tool preferably machines in a direction opposite to the locking mechanism. When the step of machining is carried out using a different tool, which is not a reciprocating saw, then machining of the workpiece is carried out in a direction towards the locking mechanism.

In yet another aspect, the present teachings provide methods of making a machining guide. An exemplar method of making according to the present teachings includes: (i) obtaining and/or producing multiple plates, spacer plates, fasteners and lock components; (ii) assembling the lock components to form a lock sub-assembly; (iii) forming two or more frames using multiple plates; (iv) integrating spacer plates between two or more of the frames to form a set of two or more frames having kerf defined therein; and (v) fastening the lock sub-assembly to the set of two or more frames to form a machining sub-assembly.

The above-described method of making further includes attaching the supplemental plates and/or the guide inserts on the machining sub-assembly to form a machining guide. This step of attaching preferably includes: (i) aligning one or more pins, which occupy one or more aligning apertures defined on surfaces of the supplemental plates and/or the guide inserts, to the notches, which are part of the multiple plates; and (ii) engaging one or more engaging apertures, which are defined on surfaces of the supplemental plates and/or the guide inserts, to the guide points on surface of the multiple plates.

In yet another aspect, the present teachings provide methods of making a guide insert. One example of the present methods of making includes: (i) obtaining fasteners and multiple plates with different sizes of apertures defined at or near their center region; and (ii) using fasteners for assembling multiple plates having same size of the aperture to form the guide insert, which has at least one of the multiple plates spaced apart from the other to form a slot that accommodates at least one of multiple plates of a frame of a machining guide sub-assembly.

In yet another aspect, the present teachings provide methods of protective machining. One example of such methods include: (i) securing a machining guide on a workpiece that is adjacent to an element that requires protection, the machining guide includes one or more kerfs defined between two or more frames, and a locking mechanism; (ii) positioning the locking mechanism between the workpiece and the element that requires protection; and (iii) machining using a tool the workpiece through the kerf and in a direction towards the locking mechanism such that presence of the locking mechanism prevents the tool from contacting the element that requires protection. The step of locking may include using a primary locking mechanism and a secondary locking mechanism. The secondary locking is designed to prevent displacement of the primary locking mechanism in an operative state. In one embodiment, the secondary locking mechanism includes a safety device that prevents movement of the locking components inside a housing. By way of example, the safety device may be a fastener or a screw that passes through an opening in the extended base plates and contacts the housing of the locking mechanism.

The present arrangements and present methods of assembling and using will be better understood from the following description of the various embodiments when read in conjunction with the accompanying drawings.

BRIEF DESCRIPTION OF THE DRAWINGS

FIG. 8 shows a perspective view of the machining guide of FIG. 1 in an operative state, during which the first guide member and/or the second guide member of the second frame pivot about a pivoting connection, and open up to acquire a position that is capable of receiving a workpiece.

FIG. 9 shows a perspective view of another machining guide, according to another embodiment of the present arrangements and that has partially fitted thereon guides inserts, which define an aperture near a center region to firmly secure a workpiece during machining.

FIG. 10 shows the guide inserts completely removed from the machining guide of FIG. 9.

DETAILED DESCRIPTION OF THE
PREFERRED EMBODIMENTS

In the following description numerous specific details are set forth in order to provide a thorough understanding of the present invention. It will be apparent, however, to one skilled in the art that the present invention may be practiced without limitation to some or all of these specific details. In other instances, well known process steps have not been described in detail in order to not unnecessarily obscure the invention.

Figure 1:
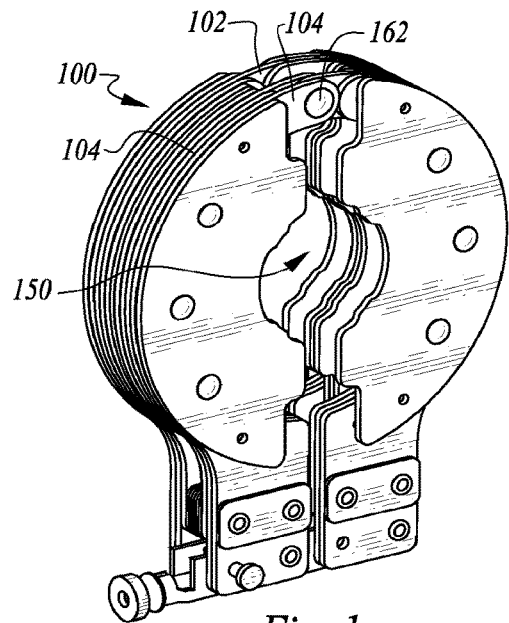
FIG. 1 shows a perspective view of a machining guide, according to one embodiment of the present arrangements and that is effectively designed to secure a workpiece (e.g., a conduit, such as a tube or a pipe, or another material having an extruded profile) and also to guide a machining tool to access the workpiece.

FIG. 1 shows a machining guide 100, according to one embodiment of the present arrangements and that, among other machining applications, may be used for making a measured and accurate cut. Machining guide 100 includes two frames 102 and 104 that are disposed adjacent to each other. Each frame includes a first guide member, a second guide member, and a pivoting connection. From the perspective view of machining guide 100 shown in FIG. 1, second pivoting connection 162 associated with frame 104 is clearly visible. The first pivoting connection 160 associated with frame 102 is clearly shown in FIG. 4. Both frames 102 and 104 have defined at or near their center region an aperture, which is designed to accommodate a workpiece during machining.

Figures 2, 3:
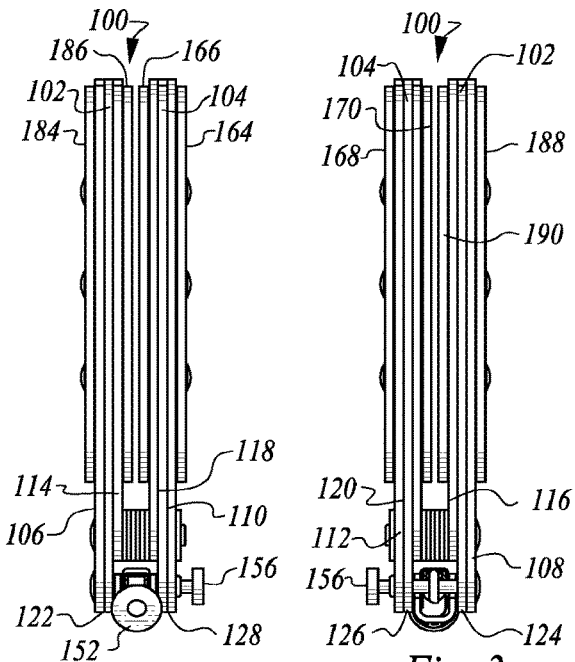
FIG. 2 shows a front view of edges of different sets of multiple plates that comprise a first frame and a second frame and that are disposed at one side of the machining guide of FIG. 1.
FIG. 3 shows a front view of edges of different sets of multiple plates that comprise the same first and the same second frames, as shown in FIG. 2, but that are disposed at another side, which is opposite to the side shown in FIG. 2, of the machining guide.

FIG. 2 shows one end of machining guide 100 from where edges of first guide members are clearly visible. According to this figure, first frame 102 at one end includes an associated first guide member 106 and second frame 104 at the same end includes an associated first guide member 110. Furthermore, each guide member has multiple plates, some of which extend to include an extended base portion and others do not include an extended base portion. In the embodiment shown in FIG. 2, first guide member 106 includes extended plates 122 that include the extended base portion, and at least one non-extended plate 114 that does not include the extended base portion. First guide member 110, associated with second frame 104, similarly includes extended plates 128 that have an extended base portion, and at least one non-extended plate 118 that does not have an extended base portion.

In accordance with one embodiment of the present arrangements, FIG. 3 shows the multiple plates disposed at the other end, i.e., disposed 180° from the other side shown in FIG. 2. In this orientation of machining guide 100, the second guide member associated with each frame is clearly visible. By way of example, first frame 102 includes an associated second guide member 108 and second frame 104 at the same end includes an associated second guide member 112. Furthermore, second guide member 108, like first guide member 106, includes extended plates 124 that have an extended base portion, and at least one non-extended plate 116 that does not have an extended base portion. Second guide member 112, associated with second frame 104, similarly includes extended plates 126 that have an extended base portion, and at least one non-extended plate 120 that does not have an extended base portion.

Plates that make up guide members (e.g., guide members 106, 108, 110 and 112) are shown to be of semicircular shape in the embodiment of FIG. 1, but they can be any shape depending on the shape of a workpiece they ultimately serve to accommodate. Moreover, FIG. 1 shows that complementary plates, e.g., plates associated with guide member 106 and guide member 108 or plates associated with guide member 110 and guide member 112, connect to define a substantially circular aperture 250 at or near a center region of machining guide 100. Aperture 250, however, need not be circular, and may be of any shape so long as a workpiece is accommodated therein for effective machining.

FIGS. 2 and 3 clearly show that certain plates, which comprise the guide members are attached to supplemental plates. Some of these supplemental plates include surfaces that face toward a kerf (which is denoted by roman numeral 144 in FIG. 6). In frame 104, plate 166 of guide member 110 and plate 170 of guide member 112 include surfaces that face toward the kerf. Similarly, in frame 102, plate 186 of guide member 114 and plate 190 of guide member 116 include surfaces that also face toward the kerf. Such surfaces, facing toward the kerf, are herein referred to as "cut surfaces."

In contrast, certain surfaces of the supplemental plates face a direction opposite to the kerf. FIGS. 2 and 3 show that in frame 104, plate 164 of guide member 110 and plate 168 of guide member 112 include surfaces that face a direction opposite to the kerf. Similarly, in frame 102, plate 184 of guide member 114 and plate 188 of guide member 116 include surfaces that also face a direction opposite to the kerf. Such surfaces, facing away from the kerf, are herein referred to as "exposed surfaces." In preferred embodiment of the present arrangements, the supplemental plates are attached to the guide member in a manner so that the cut surfaces are oriented to face the tool. Relative to the exposed surface, the cut surface of the supplemental plates preferably has a smooth finish, which allows a high precision tool to effect high precision machining.

Figure 4:
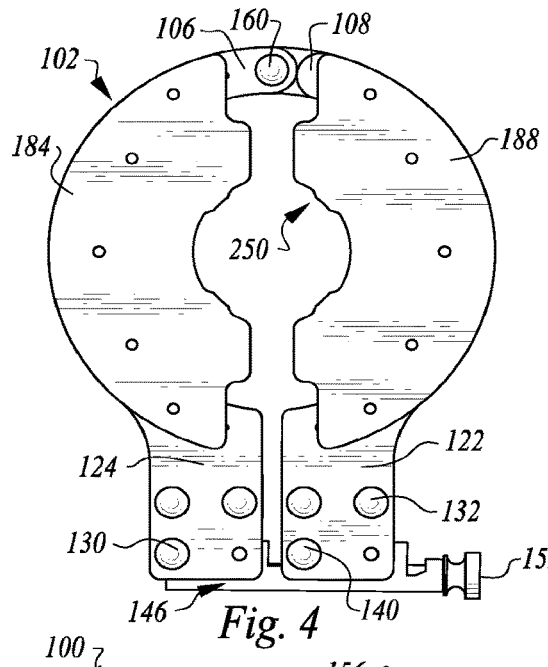
FIG. 4 shows a front view of the first frame shown in FIG. 1 and that includes its associated first guide member, second guide member, and pivoting connection.
Figure 5:
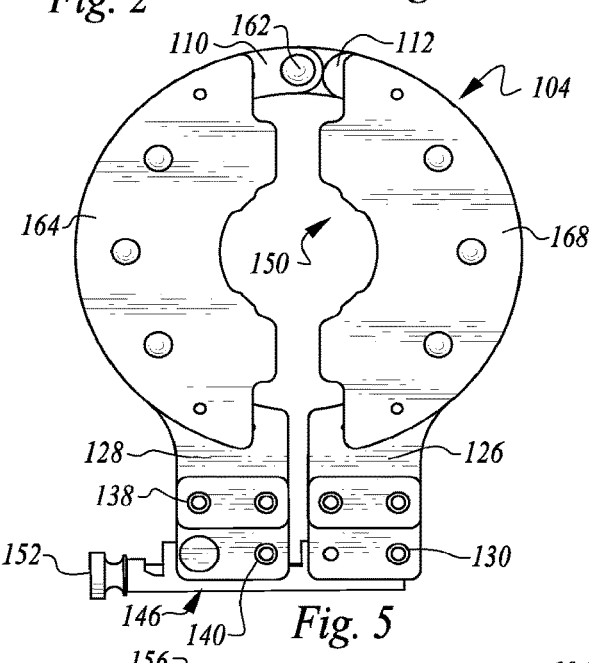
FIG. 5 shows a front view of the second frame shown in FIG. 1 and that includes its associated first guide member, second guide member, and pivoting connection.

FIG. 4 shows a front view of first frame 102, according to one embodiment of the present arrangements, of machining guide 100. From this orientation, it is clear that first frame comprises first guide member 106 and second guide member 108 and that they are pivotably connected at first pivoting connection 160. Furthermore, a substantially circular aperture 250 defined at or near a center region of frame 102 is formed by complementary placement of first guide member 106 and second guide member 108. In the configuration of FIG. 4, supplemental plate 184 attaches to one of the plates that comprise guide member 106 and supplemental plate 188 attaches to one of the plates that comprise guide member 106. Surfaces of supplemental plates 184 and 188, as their front view is shown in FIG. 4, may be thought of as exposed surfaces. FIG. 4 also shows a locking mechanism 146 that is disposed near the extended base portions of the extended base plates 122 and 124. A pin connection 130 disposed between extended base plates 124 of frame 102 and its counterpart (i.e., extended base plate 126 of frame 104 as shown in FIG. 5) fastens locking mechanism 146 at one end of the extended base plates of the two frames. As will be explained later, locking mechanism has an engaging member (i.e., engaging member 154 shown in FIG. 8) that engages with a pin connection 140. Pin connection 140 is also disposed between extended base plate 122 of frame 102 and extended base plate 128 of frame 104. Extended base portions of extended base plates 132 and 138 that face each other may also be fastened using pin connections 132 and 138 as shown in FIGS. 4 and 5.

FIG. 5 shows a front view of second frame 104, according to one embodiment of the present arrangements. According to this figure, it is clear that the second frame comprises first guide member 110 and second guide member 112 and that they are pivotably connected at second pivoting connection 162. Furthermore, a substantially circular aperture 150 defined at or near a center region of frame 104 is formed by complementary placement of first guide member 110 and second guide member 112. In the configuration of FIG. 5, supplemental plate 164 attaches to one of the plates that comprise guide member 110 and supplemental plate 168 attaches to one of the plates that comprise guide member 112. Surfaces of supplemental plates 164 and 168, as their front view is shown in FIG. 5, may be thought of as additional examples of exposed surfaces.

FIGS. 4 and 5 also show that locking mechanism 146 includes a shaft head and a detailed discussion of this mechanism is provided in connection with the description of FIGS. 8-9 and 21-22.

As mentioned above, between frames 102 and 104, one or more spacer plates (shown in FIGS. 2 and 3 and denoted by reference numeral 594 in the embodiment of FIG. 11) are positioned to define a kerf (e.g., kerf 144 of FIG. 6) between the frames. During an operative state of machining guide 102, a tool, passes through the kerf to accesses and machine a workpiece (e.g., tool 995 passes through the kerf in machining guide 100' to machine workpiece 992).

In a preferred assembled configuration, extended base plates 122 and 124 associated with first frame 102 face extended base plates 126 and 128 associated with second frame 104, respectively. As such, they may include one or more fastening connections and may also include a locking pin connection. To this end, FIG. 4 shows that extended base plate 124 includes one or more fastening connections 130. Fastening connections may also be pin connections, but they are designed to couple adjacent extended base plates form a guide member. Extended base plate 122, similar to extended base plate 124, includes one or more fastening connections 132. Pin connection 138 connects extended base plate 128 to another extended base plate and/or non-extended base plate 118 (as shown in FIG. 2). In one embodiment of the present arrangements, fastening connection 140 is a locking pin connection provided to engage with one component (e.g., engaging member 154 of FIG. 8) of locking mechanism 146.

Figure 6:
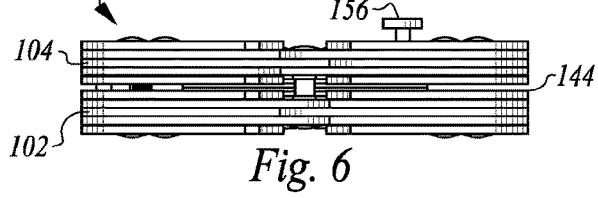
FIG. 6 shows an end view of the machining guide of FIG. 1 and that illustrates in greater detail the edges of multiple plates at one end that is proximate the pivoting connections of the machining guide of FIG. 1.

FIG. 6 shows a view of machining guide 100 that is obtained after rotating guide 100 of FIG. 4 by 90° around locking mechanism 146, showing one end of the machining guide. According to this figure, first frame 102 and second frame 104, in an assembled configuration are positioned a distance away from each other and thereby defining a space 144 therebetween.

Figure 7:
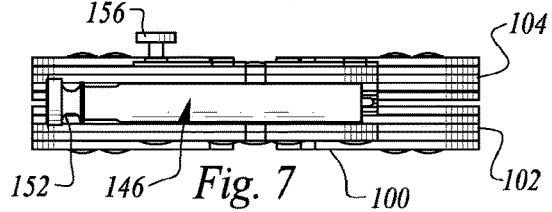
FIG. 7 shows another end view of the machining guide of FIG. 1 and that illustrates in greater detail the edges of multiple plates at the other end that is proximate a locking mechanism of the machining guide of FIG. 1.

FIG. 7 shows a view at the other end of a machining guide 100 (opposite to the end of the machining guide shown in FIG. 6), which is obtained when the machining guide of FIG. 5 is rotated by 90° around locking mechanism 146. In this orientation, components, such as the locking mechanism 146, are clearly visible.

Figure 13:
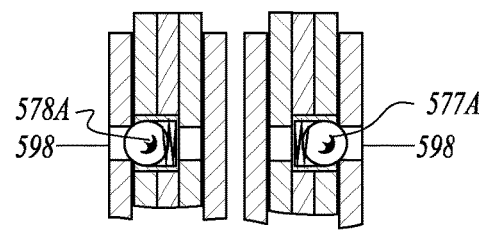
FIG. 13 shows a cross-sectional view of the engaging apertures fully aligned with the guide inserts defined on the face of the plates that comprise the frames shown in FIGS. 9 and 10.
Figure 14:
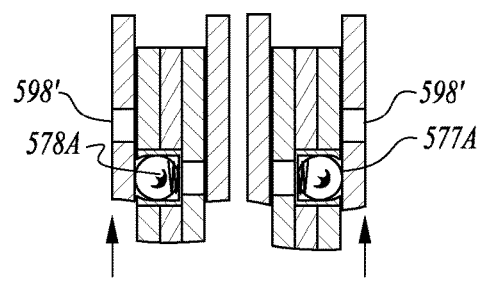
FIG. 14 shows a cross-sectional view of the engaging apertures misaligned with the guide inserts defined on the face of the plates that comprise the frame shown in FIGS. 9 and 10.

As shown in FIGS. 2 and 3, supplemental plates attach to each of the first and the second guide members of each frame. FIG. 8 shows that riveted connections 142 present on supplemental plates allow this attachment. To facilitate a strong attachment, supplemental plates may also include one or more engaging apertures 198 that engage with guide points (e.g., guide points 577A and 578A in FIGS. 13 and 14). FIGS. 13 and 14 show in greater detail the manner in which engaging apertures on supplemental plates engage with guide points present on the plates that comprise the guide members.

FIG. 8 also shows locking mechanism 146 in a fully unlocked position. At one end of locking mechanism, the locking mechanism is installed, for example, using a pin connection to a first end of the extended base portions that face each other. As shown in this figure, locking mechanism 146 includes a housing, which houses certain components (e.g., cylindrical shaft 175). In a locked position, these components extend from the first end to a second end of each of the extended base portions of the two frames (shown in FIGS. 4 and 5). According to FIG. 8, at or near the second end of the extended base portions (e.g., extended base portions of guide members 110 and 112 as shown in FIG. 5), the housing includes a threaded aperture 158 and an alignment point 136. Using a fastening or coupling mechanism at threaded aperture 158, the housing is coupled to an engaging member 154. Engaging member 154 has an engaging profile 155 that in a locked position of the locking mechanism engages with an object attached to a second end of the extended base portions. The object, among other things, may include a pin connection 140 that extends between two or more of the extended base plates that face each other.

Near the second end of the extended base portions, but of the other guide members (e.g., extended base portions of guide members 106 and 108 as shown in FIG. 4), a safety device 156 is installed. Safety device 156 functions as a secondary lock. Specifically, in a locked position to further firmly secure the workpiece during machining, safety device 156 aligns with alignment point 136. In so doing, safety device 156 locks the locking components inside locking mechanism 146, which serves as the primary locking mechanism.

FIG. 9 shows another machining guide 500, according to another embodiment of the present arrangements. Machining guide 500 includes frames 502 and 504, pivoting connection 562, threaded aperture 558, safety device 556, riveting connections 542, pin connection 530, locking mechanism 546, shaft head 552, engaging profile 555, each of which is substantially similar to their counterparts found in machining guide 100. Machining guide 500, however, does not include supplemental plates as does machining guide 100, rather includes one or more guide inserts, each of which is attached to each of the guide members that comprise the frames. Although supplemental plates and guide inserts are substantially similar in their structure (e.g., both define a supplemental aperture at or near their center region, that aligns with the apertures of the frames) and function, guide members easily attach to and detach from guide members and, therefore, guide inserts represent a preferred embodiment of the present arrangements.

In FIG. 9, the guide inserts are shown such that the guide members are partially detached from them. Each of the guide members include multiple plates, each having a surface that faces towards the kerf and having a surface that faces in an opposite direction to the kerf. In the attached position, each of these surfaces is preferably fitted onto and contact surfaces of the multiple plates that comprise the guide insert. In an assembled state, surfaces of frame 502 that face in an opposite direction to the kerf, attach to plates 584 and 588. Moreover, the unattached surfaces of plates 584 and 588 that face away from the kerf are exposed surfaces. Similarly, surfaces of frame 502 that face toward the kerf, attach to plates 586 and 590 and surfaces of these plates that face toward the kerf are cut surfaces. With respect to frame 104, surfaces that face away from the kerf, attach to plates 564 and 568 and unattached surfaces of these plates are exposed surfaces and surfaces that face towards the kerf, attach to plates 566 and 570 and unattached surface of these plates are cut surfaces. These cut and exposed surfaces of the guide insert have defined thereon aligning apertures 542, which are occupied by one or more pins. As is explained later in connection with FIG. 10, to effect attachment these pins align with notches present on the guide members.

In the configuration shown in FIG. 9, the cut surfaces that face each other continue to define a kerf in the machining guide such that a tool may pass through the kerf to effect machining. In other words, cutting surfaces that face each other in a machining guide, define a machining slot that allows a tool to effect machining of a workpiece.

Complementary guide inserts, i.e., 564 and 568, 566 and 570, 584 and 586, and 588 and 590 define a supplemental aperture that preferably aligns with apertures of the frames (e.g., aperture 150 and 250 shown in FIGS. 4 and 5). Portions of the guide insert near or at the center region that define the supplemental aperture, preferably include protruding features. During machining, when the guide inserts are disposed around the workpiece, the protruding features contact and effectively secure the workpiece. Supplemental plates, as described above, may also include protruding features for similar and other reasons.

Guide inserts and supplemental plates, as they are described above, may be thought of as an interchangeable component and that an appropriate shape and/or size is incorporated into a single machining guide, depending on the shape and/or size of the workpiece undergoing machining.

FIG. 10 shows a machining guide 500' including frames 502' and 504', but detached from the guide inserts. Frames 502' and 504' are substantially similar to their counterparts, i.e., frames 502 and 504, of FIG. 9. Component plates of the guide inserts 564', 566', 568', 570', 584', 586', 588', and 590' are substantially similar to their counterparts, i.e., guide inserts 564, 566, 568, 570, 584, 586, 588, and 590 of FIG. 9. As shown in FIG. 10, an interior boundary of the different guide member that comprise frames 502' and 504' include notches 592. In an assembled state of the present arrangements, one or more pins that pass through one or more aligning apertures 542' align with notches 592. In addition to notches, guide members preferably have additional provisions for firmly attaching to guide inserts and/or supplemental plates. Specifically, surfaces of guide members may include engaging apertures 576A, 576B, 577A and 577B, which engage with guide points as discussed in connection with FIGS. 13 and 14.

Figure 11:
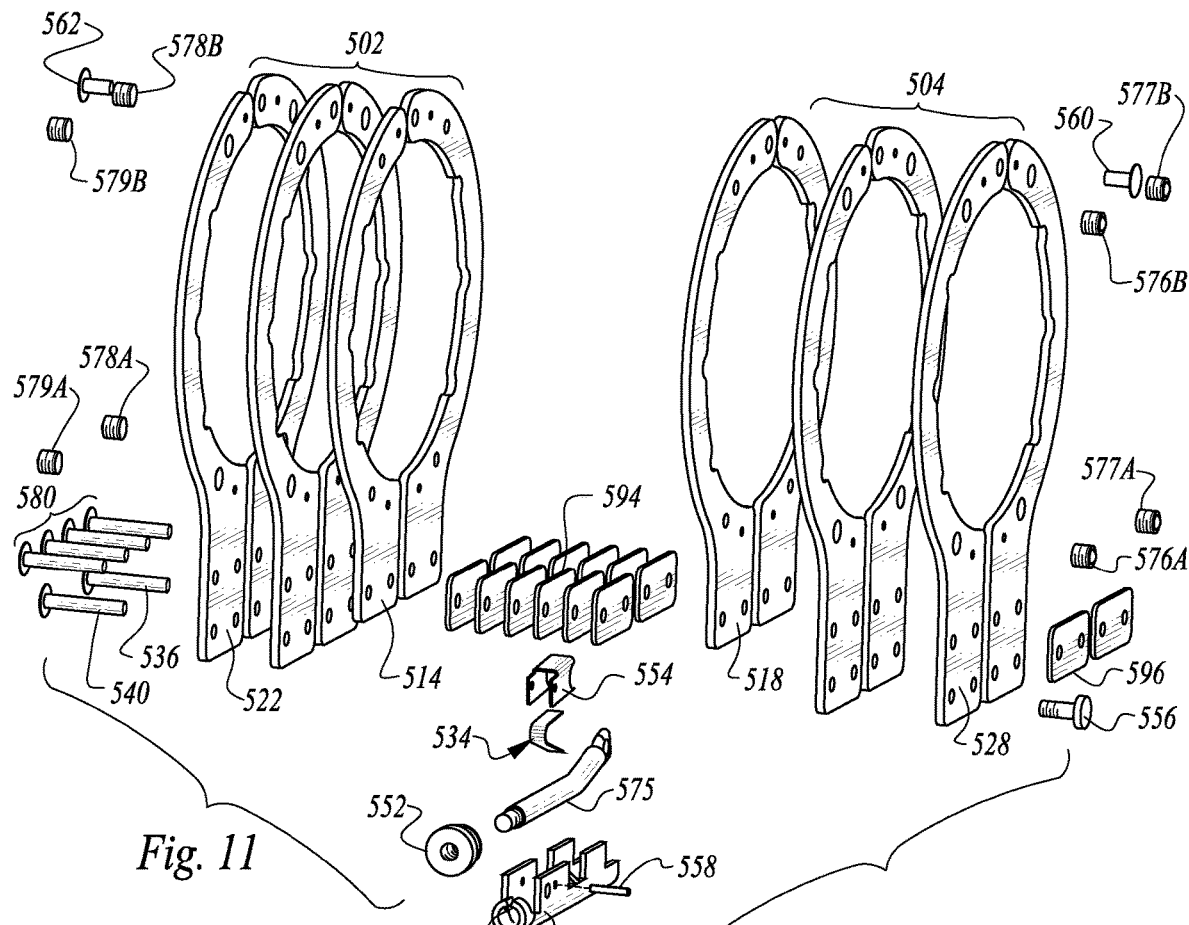
FIG. 11 shows an exploded view of the major components that comprise the machining guide shown in FIGS. 9 and 10.

FIG. 11 shows the various components used to form one embodiment of the present machining guide. According to this figure, extended base plates 522 and 528, non-extended base plates 514 and 518 are fastened using fastener components 580, 540, and 536 for forming guide members. Surfaces of guide members include guide points 576A, 576B, 577A, 577B, 578A, 578B, 579A and 579B. Pivoting connections 560 and 562 (not shown to simplify illustration) pivotally connect the guide member to form two separate frames. Spacer plates 594 disposed between the two frames introduce the kerf. Mounting plates are mounted on certain plates so that an additional locking feature, i.e., safety device 556 is integrated into the frame. Components of locking mechanism are also assembled to form the locking mechanism. Each of shaft 575 and shaft head 552 are threaded in complementary fashion so that shaft head 552 rotatably attaches to shaft 552 to form a lock sub-assembly. Housing 585 houses the sub-assembly and is connected to engaging member 554, which is in turn attached to spring 534 via pin 558. Further, housing 585 has an alignment point 536 to align with safety device 556.

Figure 12:
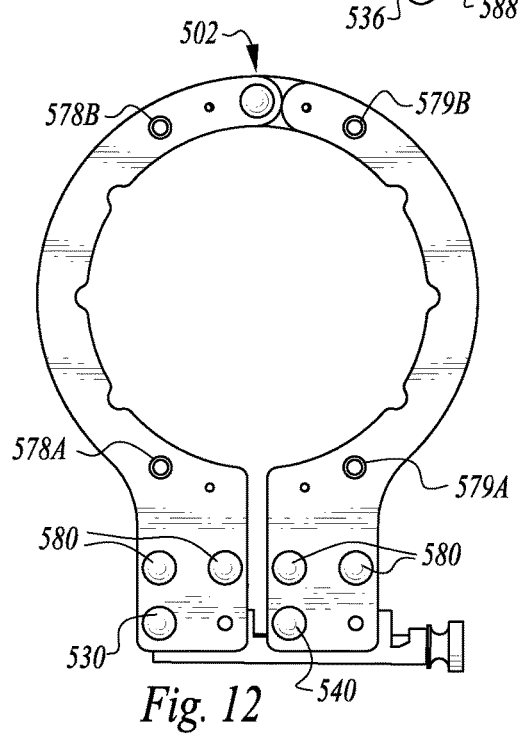
FIG. 12 shows a front view of the first frame of the machining guide of FIGS. 9 and 10 and that includes guide points to receive the guide inserts also shown in FIGS. 9 and 10.

FIG. 12 shows a frame 502 that results from the above-described assembly process. In Frame 502 of FIG. 12, supplemental plates and/or guide inserts are not shown to simplify illustration. In this figure, guide points 578A and 578B are shown on the guide member (e.g., guide member 506 of FIG. 4) of the frame and guide points 579A and 579B are shown on the other guide member (e.g., guide member 508 of FIG. 4).

FIG. 13 shows engaging apertures 598 of supplemental plates and/or guide inserts aligned and engaged with guide points 577A and 578A, which fabricated on the surfaces of guide members. FIG. 14 shows engaging apertures 598 misaligned and a disengaged state with guide points 577A and 578A. Applying an external force to misalign engaging apertures 598 with guide points 577A and 578A separates the guide members from supplemental plates and/or guide inserts. Similarly, applying an external force to align engaging apertures 598 with guide points 577A and 578A assembles the guide members with supplemental plates and/or guide inserts as shown in FIGS. 1-8 and in FIGS. 9-10.

Figure 19:
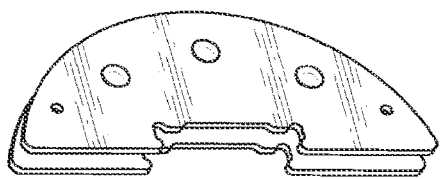
FIGS. 18 to 20 show front views of the different types of guide inserts and or supplemental plates shown in FIGS. 15 to 17, respectively.
Figure 20:
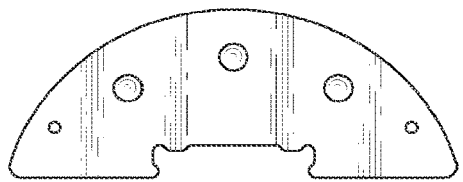
Figure 17:
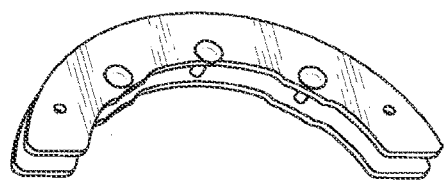
FIGS. 15 to 17 show perspective views of the different types of guide inserts and/or supplemental plates, according to certain embodiments of the present arrangements.
Figure 18:
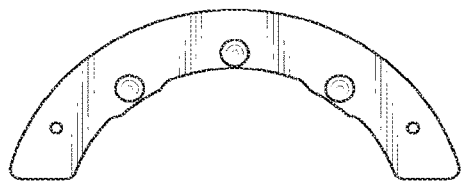
Figure 15:
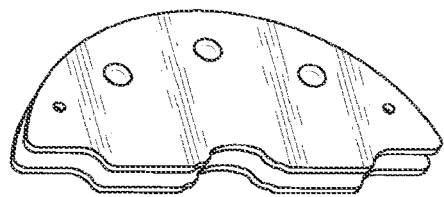
Figure 16:
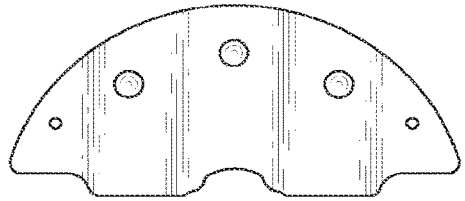

FIGS. 15-17 shows perspective views of the different types of guide inserts and/or supplemental plates, according to certain embodiments of the present arrangements. FIGS. 18 to 20 show front views of the different types of guide inserts and or supplemental plates shown in FIGS. 15 to 17, respectively.

Figure 21:
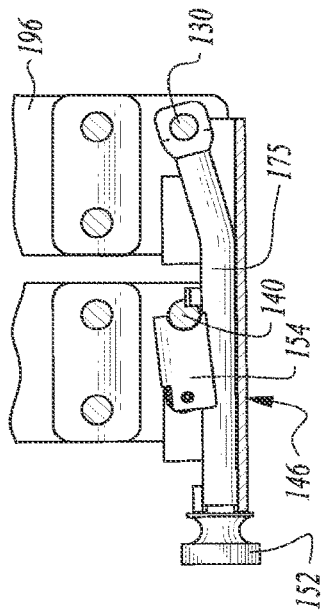
FIG. 21 shows a front view of a portion of the machining guide of FIG. 1 and that includes the adjustable locking mechanism in a closed or locked position.
Figure 22:
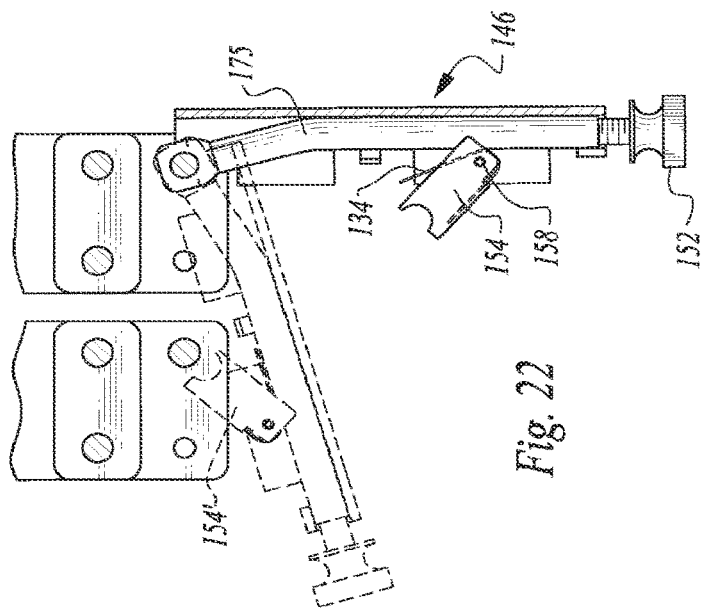
FIG. 22 shows a front view of the same portion as shown in FIG. 21, but the adjustable locking mechanism is shown in an unlocked (but partially open) position and in a completely open position.

FIGS. 21 and 22 show details of the locking mechanism 146 in one embodiment of the present arrangements. According to these figures, shaft head 152 is used for fine adjustment of the locking pressure. In this embodiment, shaft head 152 displaces on a threaded region of a shaft portion 175 to effect the desired fine adjustment. By way of example, after engaging portion 154 engages with pin connection 140, shaft head 152 is displaced (e.g., by rotating shaft head 152 in a clockwise direction) on threaded region of shaft portion 175. In one embodiment, a distal end of engaging member 154 is positioned underneath a lip of shaft head 152 and thereby engages with shaft head 152. In this position, engaging member is locked in place at the distal end (underneath the lip of shaft head 152) and at the engaging profile (with pin connection 140).

Figure 23:
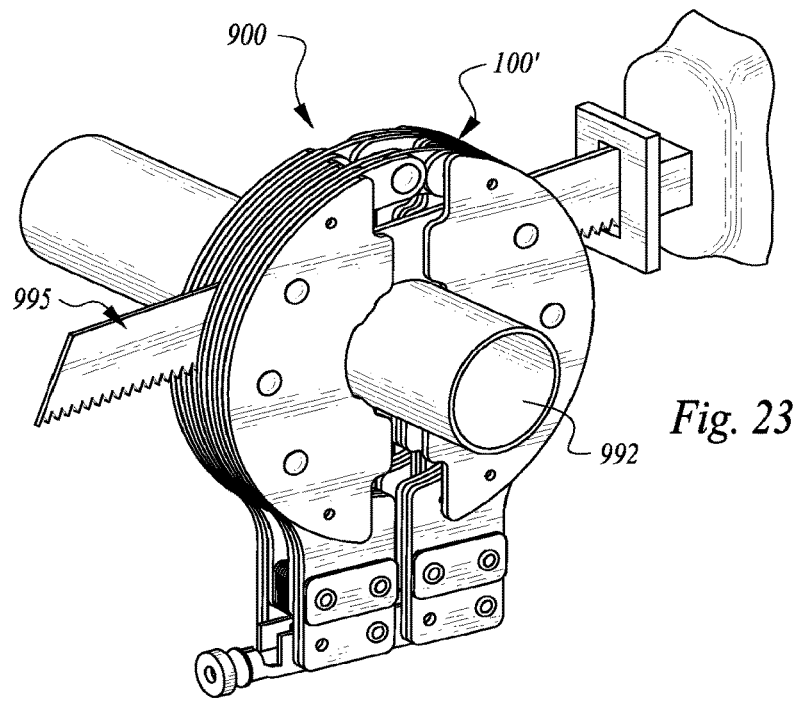
FIG. 23 shows a perspective view of a machining guide, according to one embodiment of the present arrangements and that is facilitating cutting of a workpiece.

FIG. 23 shows a machining assembly 900, according to one embodiment of the present arrangements and that has integrated into it a machining guide 100' of the present arrangements. Machining guide 100' is substantially similar to machining guide 100 (shown in FIGS. 1-8) and machining guide 500 (shown in FIGS. 9 and 10). A tool 995 machines a workpiece 992 through a kerf defined inside the machining guide.

Figure 24:
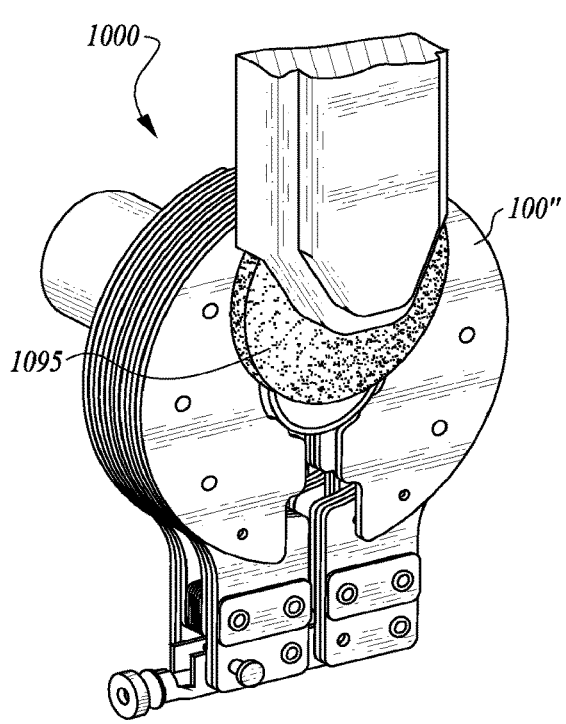
FIG. 24 shows a perspective view of a machining guide, according to one embodiment of the present arrangements and that is facilitating sanding of a workpiece.

FIG. 24 shows a machining assembly 1000, according to another embodiment of the present arrangements and that has integrated into it a modified machining guide 100" of the present arrangements. Modified machining guide 100" represents a modified embodiment of machining guide 100 or 500. Specifically, modified machining guide 100" is obtained by reversing the position of the plates that comprise the guide inserts, relative to the frames such that the cut surfaces that may have been (during a machining operation) facing towards the kerf are now facing in the opposite direction to the kerf. As explained above, the exposed surface of the guide inserts faces the kerf. In this configuration, modified machining guide 100" is disposed around a workpiece and the machined surface, which may have been obtained from a pervious machining operation, aligns with the cut surface of the supplemental plates and/or guide inserts. A sanding apparatus 1095 commences sanding of the machined surface.

Figure 25:
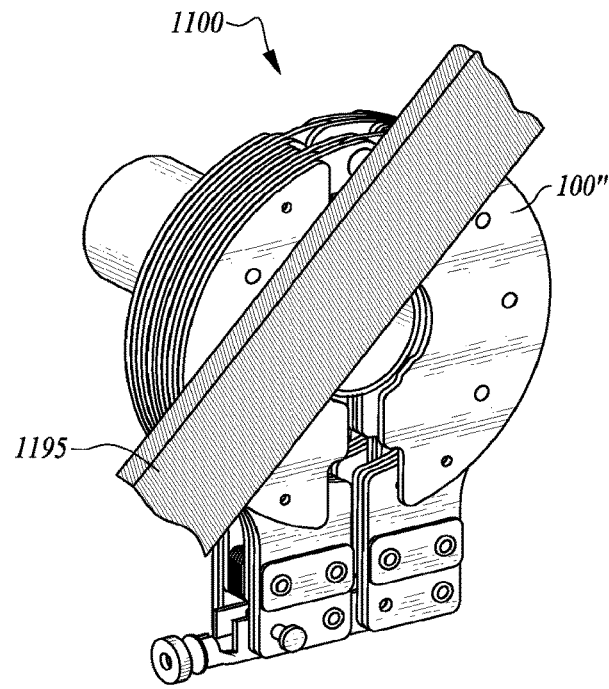
FIG. 25 shows a perspective view of the machining guide, according to one embodiment of the present arrangements and that is facilitating polishing of a workpiece.

FIG. 25 shows a machining assembly 1100, according to another embodiment of the present arrangements and that has integrated into it modified machining guide 100" shown in FIG. 24. Once the sanding operation concludes, a polishing apparatus 1195 commences its operation.

Figure 26:
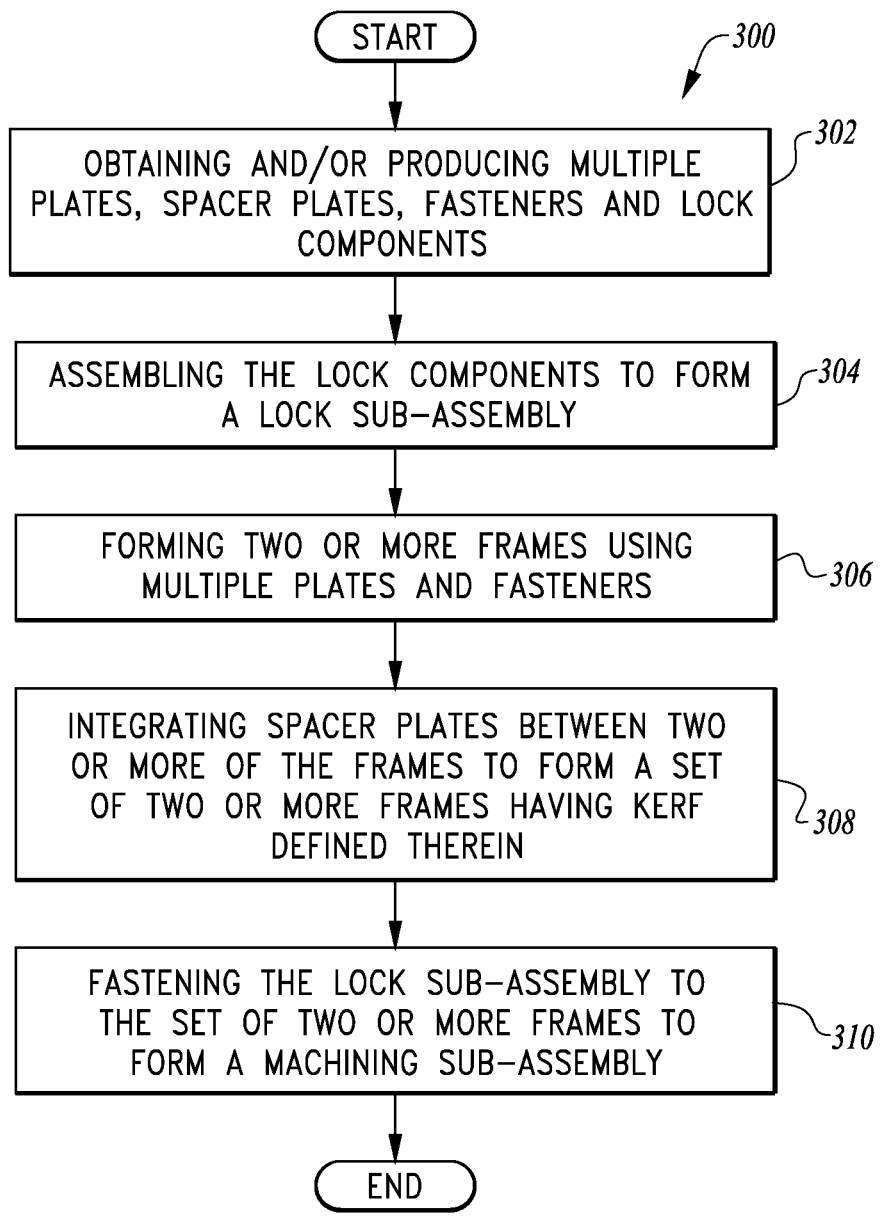
FIG. 26 is a process flow diagram, according to one embodiment of the present teachings, for assembling machining guides of the present arrangements.
Figure 27:
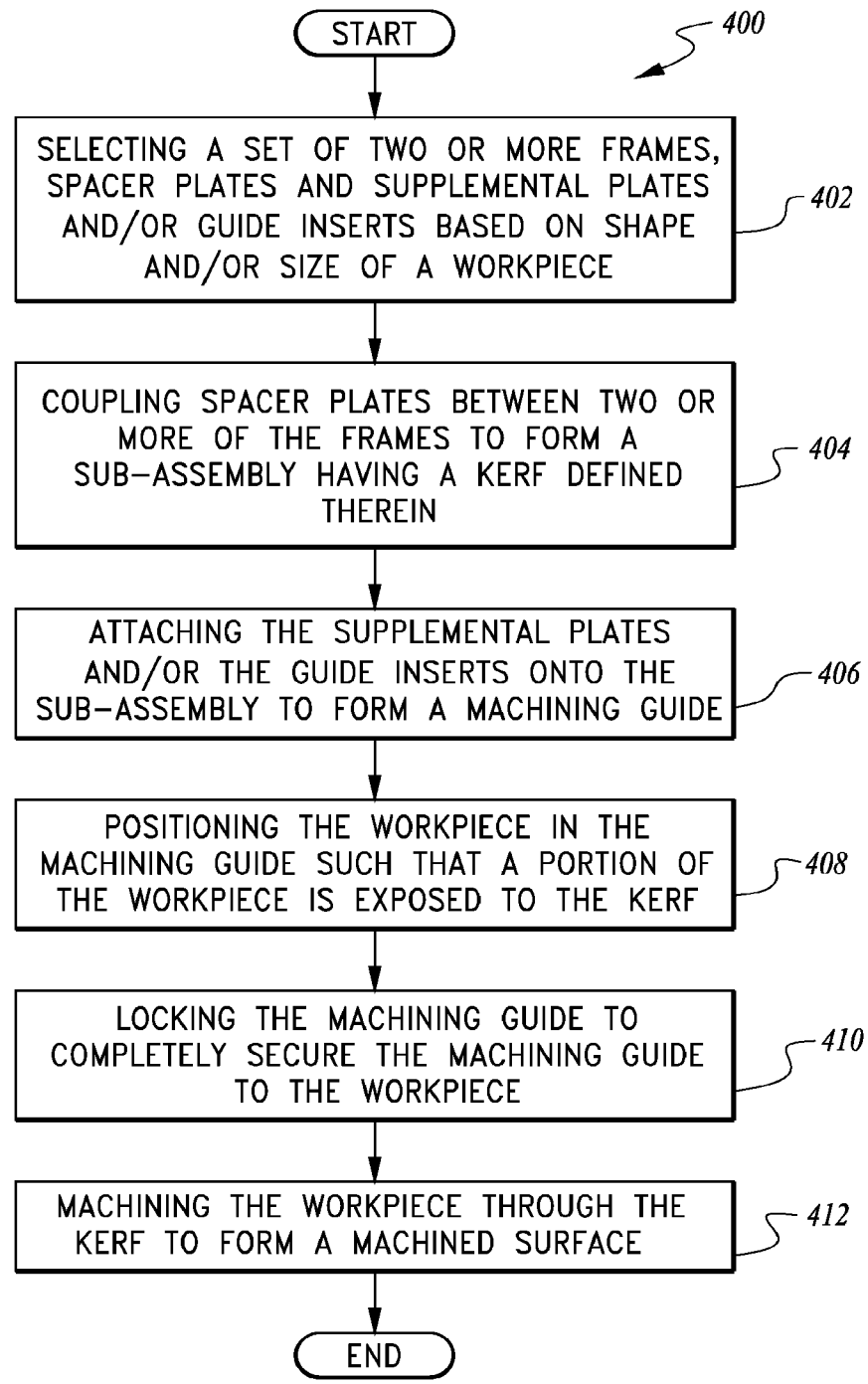
FIG. 27 is a process flow diagram, according to one embodiment of the present teachings, for using machining guides of the present arrangements.

The present teachings provide methods of making a machining guide (e.g., machining guide 100 of FIGS. 1-8 and machining guide 500 of FIGS. 9, 10 and 11). FIG. 26 shows a method of making a machining guide 300. Method 300 may begin with a step 302, which includes obtaining and/or producing multiple plates, spacer plates, fasteners and lock components (e.g., plates, spacer plates, fasteners and lock components shown in FIG. 11). Next a step 304 involves assembling the lock components to form a lock sub-assembly (e.g., lock assembly shown in FIGS. 21 and 22). Then method 300 proceeds to step 306 that includes forming two or more frames using multiple plates (e.g., frame shown in FIG. 12). Once the frame is formed, step 308 is performed. This step includes integrating spacer plates between two or more of the frames to form a set of two or more frames that has a kerf defined between two or more of the frames (e.g., spacers 594 of FIG. 11 produce kerf 144 of FIG. 6). Method 300 continues to step 310, which involves fastening the lock sub-assembly to the set of two or more frames to form a machining sub-assembly ((e.g., fastening components shown in FIG. 11 and assembled configuration shown in FIGS. 21 and 22). As explained below, the machining sub-assembly attaches to supplemental plates and/or the guide inserts to form the present machining guides.

The present teachings also provide methods of making the supplemental plates and/or the guide inserts (e.g., supplemental plates shown in FIGS. 2 and 3 and guide inserts shown in FIGS. 9 and 10). As explained above, a machining sub-assembly, which includes two or more of the frames, attaches to the supplemental plates and/or the guide inserts to form a machining guide. The method of making, according to one embodiment of the present teachings, the supplemental plates and/or the guide inserts begins by obtaining fasteners and multiple plates with different sizes of apertures defined at or near their center region. Next, the method involves using fasteners for assembling multiple plates having same size of the aperture to form the guide insert, which has at least one of the multiple plates spaced apart from the other to form a slot (e.g., slots in guide inserts shown in FIGS. 9 and 10) that accommodates at least one of multiple plates of a frame of a machining guide sub-assembly.

According to the present teachings, the supplemental plates and/or the guide inserts integrate with the machining sub-assembly resulting from step 310 to form the machining guide. One preferred embodiment of the present attaching method includes first aligning one or more pins (e.g., connections 542), which occupy one or more aligning apertures defined on surfaces of the supplemental plates and/or the guide inserts, to the notches (e.g., notches 592), which are part of the multiple plates. Next, this preferred embodiment includes engaging one or more engaging apertures (e.g., 598 shown in FIG. 13), which are defined on surfaces of the supplemental plates and/or the guide inserts, to the guide points (e.g., 577A and 578A shown in FIG. 13) on surface of the multiple plates.

The present teachings provide effective methods of machining 400. Method 400 may begin with step 402, which includes selecting a set of two or more frames, space plates and supplemental plates and/or guide inserts based on shape and size of a workpiece. Then a step 404 involves coupling spacer plates between two or more of said frames to form a sub-assembly having a kerf therebetween. It is important to note, however, that steps 402 and 404 are optional and need not be performed. In a preferred embodiment of the present teachings, method 400 may begin with a step that includes obtaining a machining sub-assembly including two or more frames based on shape and/or size of a workpiece, and said machining subassembly including spacer plates disposed between two or more of the frames to define a kerf between the frames.

Once the machining sub-assembly is formed, a step 406 is carried out. According to this step, one or more supplemental plates and/or one or more guide inserts are attached onto the machining sub-assembly to form a machining guide. Next a step 408 includes positioning the machining guide onto the workpiece such that one or more of the supplemental plates and/or one or more of the guide inserts contact the workpiece. In this configuration, a portion of the workpiece is exposed to the kerf. Then, a step 410 involves locking the machining guide to secure the machining guide to the workpiece. Finally, a step 412 includes machining the workpiece through the kerf (e.g., FIG. 23) to form a machined surface.

In a preferred embodiment of the present teachings, step 408 of positioning the workpiece in the machining guide includes identifying on the workpiece a machining location where the workpiece is to undergo machining. More preferably, step 408 also includes identifying on the workpiece a secondary location, which is a certain distance away from the machining location.

Regardless of whether a secondary location is identified, step 408 next involves securing the machining guide to the workpiece such that the machining location is exposed to the kerf before machining commences. If the secondary location is identified, then it is more preferable to commence machining when the secondary location is substantially aligned with an outside boundary of the machining guide.

Step 410 of locking preferably includes using a primary locking mechanism and a secondary locking mechanism. The present teachings recognize that during typical machining operations, the workpiece experiences significant external forces from the machining action of a tool. The external forces are large enough to displace the secured workpiece, undergoing machining, from its clamped state. To this end, the present teachings offer the secondary locking mechanism, which prevents displacement of the primary locking mechanism in an operative state of the machining guide.

In one embodiment, step 412 of machining is carried out using a tool that machines the workpiece in a direction towards the locking mechanism. In the event the tool is a reciprocating saw or includes a blade that is capable of being inserted in the kerf at one end while it is secured at another end, however, the tool preferably machines in a direction opposite to the locking mechanism.

As explained previously, supplemental plates and/or the guide inserts may include a cut surface such that step 406 includes arranging the cut surface to face the kerf during the machining operation described above. Another implementation of the machining method, however, continues and further includes unlocking the machining guide to displace the machining guide from the workpiece. When the machining guide is free of the workpiece, then one embodiment of the present methods focuses on the supplemental plates and/or the guide inserts. Specifically, machining preferably proceeds to reversing placement of the supplemental plates and/or the guide inserts relative to the set of two or more frames to form a modified machining guide. In this configuration, the cut surface faces away from the kerf and an exposed surface of the supplemental plates and/or the guide inserts that is opposite to the cut surface, now faces towards the kerf. At this stage, the modified machining guide may be ready to receive the workpiece for further processing. As a result, the machining method may then include placing the modified machining guide on the workpiece such that the machined surface is disposed relative to the exposed surface of the modified machining guide. Next, a step of locking is carried out. This step includes locking the modified machining guide to secure the modified machining guide to the workpiece. In a secured state, the workpiece is ready for trueing up (e.g., sanding or polishing as shown in FIGS. 24 and 25, respectively). Specifically, the machined surface undergoes truing relative to the exposed surface to form an effective trued surface of a workpiece.

The present teachings also provide methods of protective machining. One example of such methods begins with securing a machining guide on a workpiece that is adjacent to an element that requires protection. The machining guide (e.g., machining guide 100 of FIGS. 1-6) preferably includes one or more kerfs defined between two or more frames and a locking mechanism. The protective machining step that proceeds to a step of positioning the locking mechanism between the workpiece and the element that requires protection. Next, using a tool, machining of the workpiece through the kerf and in a direction towards the locking mechanism is carried out. In this configuration, the presence of the locking mechanism (e.g., locking mechanism 146 as shown in FIGS. 21 and 22) prevents the tool from contacting the element that requires protection.

According to the present teachings, locking in any machining method preferably includes using a primary locking mechanism and a secondary locking mechanism. The secondary locking is designed to prevent displacement of the primary locking mechanism in an operative state. In one embodiment, the secondary locking mechanism includes a safety device that prevents movement of the locking components inside a housing. By way of example, the safety device may be a fastener or a screw that passes through an opening in the extended base plates.

Although illustrative embodiments of this invention have been shown and described, other modifications, changes, and substitutions are intended. Although the guide designs of the present invention are described in connection with conduits, those skilled in the art will recognize that the present machining guides may be used on any material (e.g., tube, pipe and extrusions of any profile) for aligning accurate cuts by using, if necessary, interchangeable supplemental plates and/or guide inserts. Further, modifications discussed in reference to machining guide 100, 100' or 100" apply to machining guide and 500, and vice versa. Accordingly, it is appropriate that the appended claims be construed broadly and in a manner consistent with the scope of the disclosure, as set forth in the following claims.

What is claimed is:

1. A machining guide comprising:
   two or more frames, each of which includes:
   a first guide member including first multiple plates;
   a second guide member including second multiple plates; and
   a pivoting connection pivotably connecting said first guide member and said second guide member, and wherein, during an operative state of said machining guide, one or both of said first and said second guide members of two or more of said frames pivot about said pivoting connection to allow two or more of said frames to be disposed around a workpiece;
   one or more first spacer plates being disposed between each of said first guide member of one of said frames and said first guide member of another of said frames, and define a single kerf between each of said frames such that, during said operative state of said machining guide, said first spacer plates remain stationary with respect to each of said first guide member of one of said frames and with respect to said first guide member of another of said frames such that a tool is capable of machining said workpiece through said kerf; and
   wherein each of said first multiple plates and said second multiple plates include at least one extended base plate and at least one non-extended base plate, and said extended base plate includes an extended base portion and said non-extended plate does not include said extended base portion, and
   said non-extended base plates in said first and said second guide members associated with one frame are arranged to face said non-extended base plates in said first and said second guide members associated with another frame, and
   one or more of said spacer plates being disposed between said non-extended base plates associated with said one frame and said non-extended base plates associated with said another frame to define said kerf between said one and said another frames.

2. The machining guide of claim 1, wherein at or near a center region of each of said first and said second frames having defined an aperture for accommodating said workpiece during said operative state of said machining guide.

3. The machining guide of claim 1, further comprising a locking mechanism fastened at one end to a first end of each of said extended base portions of said extended base plates associated with said one and said another frames, and
   wherein said extended base plate associated with said one frame is arranged to face said extended base plate associated with said another frame.

4. The machining guide of claim 3, further comprising a housing, which houses certain components of said locking mechanism, extends from said first end to a second end of said each of extended base portions of said extended base plates associated with said one and associated with said another frames, and
   wherein said housing includes an alignment point, and at or near said second end an aperture is defined to receive or engage with a safety device, and in an operative state of said locking mechanism, said safety device pushes up against said housing to engage with said alignment point.

5. The machining guide of claim 3, wherein said locking mechanism at another end includes an engaging member having an engaging profile that in a locked position of said locking mechanism, engages with an object attached to a second end of said extended base portions of said extended base plates associated with said one and said another frames.

6. The machining guide of claim 5, wherein said object includes a pin connection that extends between two or more of said extended base plates that face each other.

7. The machining guide of claim 5, wherein said engaging member is spring loaded such that when preparing for a locking process using said locking mechanism, said engaging member is in alignment with said pin.

8. The machining guide of claim 7, wherein said locking mechanism further comprises a housing that houses a shaft that is threaded to receive a threaded shaft head, and said shaft is rotatably coupled to said threaded shaft head such that said shaft head is capable of rotating about an axis that passes through said shaft, and said shaft head is rotated about said axis to push against or, alternatively, move away from said housing, and said engaging member is coupled to said housing, and in a locked position of said locking mechanism, said shaft head is capable of being rotated to push against said housing, which is configured to apply a force on said engaging member to hold said machining guide in a secure position around said workpiece.

9. The machining guide of claim 3, wherein said locking mechanism comprises a housing that has two parallel surfaces and in a locked position, each of two said parallel surfaces contact and/or align with a surface of said extended base portions of said extended base plates of said one and said another frames.

10. The machining guide of claim 1, further comprising one or more supplemental plates and/or guide inserts coupled to surfaces of said first and said second multiple plates of said first and said second guide members of two or more of said frames, and wherein at or near a center region of each of said first and said second multiple plates, an aperture is defined to accommodate said workpiece during said operative state of said machining guide, and at or near a center region of said one or more of supplemental plates and/or guide inserts, a supplemental aperture is defined, such that, during an operative state of said machining guide, said supplemental aperture aligns with said aperture to receive said workpiece.

11. The machining guide of claim 10, wherein a portion of said one or more of supplemental plates and/or guide inserts that is disposed at or near a center region and that defines said supplemental aperture includes certain protruding features, and wherein when said portion of said one or more of supplemental plates and/or guide inserts is disposed around said workpiece, said protruding features contact and effectively secure said workpiece.

12. The machining guide of claim 10, wherein one or more supplemental plates and/or guide inserts include cut surfaces that are coupled to certain of said first and said second multiple plates that face said kerf between said one and said another frame, such that said cut surfaces of one or more of said supplemental plates and/or of said guide inserts are also arranged to face said kerf between said one and said another frames.

13. The machining guide of claim 10, wherein one or more supplemental plates and/or guide inserts including exposed surfaces that are coupled to certain of said first and said second multiple plates that face away from said kerf between said one and said another frame, such that said exposed surfaces of one or more of said supplemental plates and/or said guide inserts are also arranged to face way from said kerf or be exposed.

14. The machining guide of claim 1, wherein each of said first and said second guide members include surfaces having defined thereon one or more apertures, each of which is designed to receive a fastener that attaches one or more supplemental plates to each of said first and said second guide members.

15. The machining guide of claim 1, wherein one or more pins occupy one or more aligning apertures defined on surfaces of said supplemental plates and/or said guide inserts, and said surfaces of said supplemental plates and/or said guide inserts have defined thereon one or more engaging apertures, and in an assembled state of said machining guide, one or more of said pins align with one or more notches, which are part of said first and said second multiple plates of said one and said another frames, and one or more guide points, which are disposed on surface of said supplemental plates and/or said guide inserts, engage with said engaging apertures.

16. The machining guide of claim 1, wherein said tool is any one member chosen from a group comprising cutting apparatus, sanding apparatus and polishing apparatus.

17. The machining guide of claim 1, further comprising one or more second spacer plates being disposed between each of said second guide member of one of said frames and said second guide member of another of said frames, and one or more of said first spacer plates and one or more of said second spacer plates define said kerf between each of said frames such that, during said operative state of said machining guide, said second spacer plates remain stationary with respect to each of said second guide member of one of said frames and with respect to said second guide member of another of said frames such that a tool is capable of machining said workpiece through said kerf.

* * * * *